US009864909B2

(12) United States Patent
Bare et al.

(10) Patent No.: US 9,864,909 B2
(45) Date of Patent: *Jan. 9, 2018

(54) SYSTEM AND METHOD FOR USING AUGMENTED REALITY DISPLAY IN SURFACE TREATMENT PROCEDURES

(71) Applicant: Huntington Ingalls Incorporated, Newport News, VA (US)

(72) Inventors: Brian Bare, Newport News, VA (US); Jonathan Martin, Newport News, VA (US); Patrick Ryan, Newport News, VA (US); Paul Sells, Los Angeles, CA (US); Mark Lawrence, Newport News, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/824,567

(22) Filed: Aug. 12, 2015

(65) Prior Publication Data
US 2015/0347854 A1 Dec. 3, 2015

Related U.S. Application Data

(63) Continuation-in-part of application No. 14/695,636, filed on Apr. 24, 2015, now Pat. No. 9,734,403.
(Continued)

(51) Int. Cl.
| | |
|---|---|
| *G06K 9/00* | (2006.01) |
| *G06T 19/00* | (2011.01) |
| *G01S 5/00* | (2006.01) |

(52) U.S. Cl.
CPC ........ *G06K 9/00671* (2013.01); *G06T 19/006* (2013.01); *G01S 5/00* (2013.01);
(Continued)

(58) Field of Classification Search
CPC . G06K 9/00671; G06T 19/006; G06T 7/0002; G06T 7/40; G06T 2200/24; G01S 5/00; G01S 2205/00
See application file for complete search history.

(56) References Cited

U.S. PATENT DOCUMENTS

| | | | |
|---|---|---|---|
| 4,863,268 A | * 9/1989 | Clarke | .................... G01F 1/661 |
| | | | 348/128 |
| 7,852,355 B2 | 12/2010 | Friedrich | |

(Continued)

FOREIGN PATENT DOCUMENTS

| | | |
|---|---|---|
| WO | WO 2013/023705 | 2/2013 |
| WO | WO 2013/049248 | 4/2013 |
| WO | WO 2014/015378 | 1/2014 |

OTHER PUBLICATIONS

Yajko, U.S. Appl. No. 61/951,603 of PG Pub 2017/0132799 A1, filed Mar. 12, 2014.*

(Continued)

*Primary Examiner* — Michelle L Sams
(74) *Attorney, Agent, or Firm* — Hunton & Williams LLP

(57) ABSTRACT

A method for providing target object surface information to a mobile device user is presented. The method includes receiving a request for target object surface information from a mobile device, determining the pose of the mobile interface device relative to the target object, and obtaining target object surface information for one or more measurable target object surface parameters. The target object data is used to assemble augmented reality surface information configured for viewing in conjunction with a real-time view of the target object captured by the mobile interface device. The target object augmented reality surface information is then transmitted to the mobile device for display to the user.

24 Claims, 7 Drawing Sheets

Related U.S. Application Data

(60) Provisional application No. 61/984,159, filed on Apr. 25, 2014, provisional application No. 61/997,793, filed on Jun. 9, 2014, provisional application No. 62/025,041, filed on Jul. 16, 2014, provisional application No. 62/036,762, filed on Aug. 13, 2014.

(52) U.S. Cl.
CPC ....... *G01S 2205/00* (2013.01); *G06T 2200/24* (2013.01); *G06T 2210/61* (2013.01)

(56) References Cited

U.S. PATENT DOCUMENTS

| | | |
|---|---|---|
| 8,248,467 B1 | 8/2012 | Ganick et al. |
| 8,542,906 B1 | 9/2013 | Persson et al. |
| 9,170,766 B2 | 10/2015 | Meier |
| 2002/0075451 A1 | 6/2002 | Ruiz |
| 2002/0191004 A1 | 12/2002 | Ebersole |
| 2003/0210228 A1 | 11/2003 | Ebersole |
| 2007/0050115 A1 | 3/2007 | Discenzo et al. |
| 2007/0081695 A1 | 4/2007 | Foxlin |
| 2007/0088526 A1 | 4/2007 | Friedrich et al. |
| 2009/0095086 A1 | 4/2009 | Kessler |
| 2009/0215471 A1 | 8/2009 | Sands |
| 2010/0190449 A1 | 7/2010 | Suzuki |
| 2010/0238161 A1 | 9/2010 | Varga |
| 2010/0321389 A1 | 12/2010 | Gay |
| 2011/0115816 A1 | 5/2011 | Brackney |
| 2011/0164163 A1 | 7/2011 | Bilbrey |
| 2011/0187744 A1 | 8/2011 | Kim et al. |
| 2011/0216090 A1 | 9/2011 | Woo et al. |
| 2011/0306412 A1 | 12/2011 | Ehara et al. |
| 2012/0001938 A1 | 1/2012 | Sandberg |
| 2012/0015730 A1 | 1/2012 | Watkins, Jr. |
| 2012/0098754 A1 | 4/2012 | Kim |
| 2012/0098859 A1 | 4/2012 | Lee et al. |
| 2012/0218263 A1 | 8/2012 | Meier |
| 2013/0057581 A1 | 3/2013 | Meier |
| 2013/0113827 A1 | 5/2013 | Forutanpour et al. |
| 2013/0113993 A1 | 5/2013 | Dagit, III |
| 2013/0136300 A1 | 5/2013 | Wagner et al. |
| 2013/0154824 A1 | 6/2013 | Cai |
| 2013/0162632 A1 | 6/2013 | Varga |
| 2013/0231779 A1 | 9/2013 | Purkayastha et al. |
| 2013/0253824 A1 | 9/2013 | Yang |
| 2013/0321245 A1* | 12/2013 | Harper .................... G06F 3/147 345/7 |
| 2013/0342568 A1 | 12/2013 | Ambrus |
| 2014/0063055 A1 | 3/2014 | Osterhout |
| 2014/0071163 A1 | 3/2014 | Kinnebrew et al. |
| 2014/0111544 A1 | 4/2014 | Hammond |
| 2014/0118397 A1 | 5/2014 | Lee et al. |
| 2014/0188333 A1* | 7/2014 | Friend .................... E02F 9/261 701/34.4 |
| 2014/0267417 A1 | 9/2014 | Bare et al. |
| 2014/0280199 A1 | 9/2014 | Bare et al. |
| 2014/0282911 A1 | 9/2014 | Bare et al. |
| 2015/0029819 A1 | 1/2015 | Yacoubian |
| 2015/0042678 A1* | 2/2015 | Alt .......................... G06F 3/005 345/633 |
| 2015/0188984 A1 | 7/2015 | Mullins |
| 2015/0283700 A1 | 10/2015 | Trautman |
| 2015/0294506 A1 | 10/2015 | Bare et al. |
| 2015/0310279 A1 | 10/2015 | Bare et al. |
| 2017/0132799 A1* | 5/2017 | Yajko ....................... G06T 7/40 |

OTHER PUBLICATIONS

Hammad, "Distributed Augmented Reality for Visualising Collaborative Construction Tasks", Journal of computing in civil engineering, No. 6, Oct. 15, 2009, pp. 171-183.

Chen et al., "A Smart Crane Operations Assistance System Using Augmented Reality Technology", Proceedings of 28 Internation Symposium on Automation and Robotics in Construction, 2011, pp. 643-649.

International Search Report of the International Searching Authority issued in PCT/US2015/040562, dated Oct. 15, 2015 (2 pages).

International Search Report of the International Searching Authority issued in PCT/US2015/033972, dated Aug. 21, 2015 (2 pages).

International Search Report of the International Searching Authority issued in PCT/US2015/044838, dated Nov. 12, 2015 (2 pgs).

PCT International Search Report for International Application No. PCT/US2015/027534, dated Jul. 30, 2015, 2 pages.

PCT International Search Report for International Application No. PCT/US2015/025784, dated Jul. 20, 2015, 2 pages.

U.S. Appl. No. 61/857,391 of 2015/0029819.

\* cited by examiner

US 9,864,909 B2

SYSTEM AND METHOD FOR USING AUGMENTED REALITY DISPLAY IN SURFACE TREATMENT PROCEDURES

CROSS-REFERENCE TO RELATED APPLICATIONS

This application is a continuation-in-part of U.S. application Ser. No. 14/695,636, filed Apr. 24, 2015, which claims priority to U.S. Provisional Application Nos. 61/984,159, filed Apr. 25, 2014; 61/997,793, filed Jun. 9, 2014; 62/025,041, filed Jul. 16, 2014; and 62/036,762, filed Aug. 13, 2014, the complete disclosures of which is incorporated herein by reference in its entirety. The embodiments in this application are related to those in U.S. application Ser. No. 14/686,427, filed Apr. 14, 2015, the complete disclosure of which is incorporated herein by reference.

BACKGROUND OF THE INVENTION

This application relates generally to the use of augmented reality to display changes in dynamic environments and, more particularly, to the use of augmented reality to provide information and direction to users performing operations on or applying coatings to surfaces in such dynamic environments.

Augmented reality (AR) provides a view of a physical, real-world environment whose elements are augmented (or supplemented) by computer-generated sensory input such as sound, text, graphics, or video. In a typical AR application, a data processor reviews a camera-captured image for cues that trigger the display of additional information and images along with a display of the captured image.

While AR is useful for conveying information via a static display, it is particularly useful in dynamic situations and environments where images are captured and displayed in real-time and the information to be displayed using AR (hereinafter, "AR information") changes. The ability to provide constant update to the AR information in response to changes in the environment and location and relative positioning of the user's display provides great utility in various applications including construction, repair, maintenance, and safety.

A particularly significant example of a dynamic spatial environment is the space on board a large ship. Not only does the ship itself move, its structure is flexible so that the position of a particular compartment, deck portion, supporting structure, or exterior surface in one part of the ship may change relative to other parts of the ship. Similar dynamic behavior can occur in tall buildings, construction sites, outdoor processing plants, roadways, bridges, etc.

In addition to changes in environmental structure, dynamic environments experience changes in an essentially infinite number of conditions. These can be as simple as changes in measurable atmospheric conditions (e.g., temperature and pressure) or as complex as changes in surface topography due to thermal expansion and contraction.

There are many instances where construction or maintenance operations on large structures such as ships require information on changes in the dynamic environment and/or differences between an intended design condition/configuration and the current as-built (or as-worn) condition/configuration. Many of these instances relate to application, modification, or removal of paint, insulation, or other surface covering/coating. Efficient completion of these tasks requires accurate and up-to-date information on the current and desired condition of the structural surface and any coating or other covering material defining some or all of that surface.

For as many different possible conditions there are in a given environment, there are as many instances where rapid communication of changes in such conditions to individuals operating in or on that environment is essential.

SUMMARY OF THE INVENTION

An illustrative aspect of the invention provides a method for providing information to a mobile interface device user for use in conducting an operation on a surface of a target object in a dynamic structural environment. The method comprises receiving on a central data processor from the mobile interface device over a communication network a request for target object surface information, determining a pose of the mobile interface device relative to the target object surface, and obtaining target object surface information for one or more measurable target object characteristics. The method further comprises assembling AR target object surface information for transmission to and display on the mobile interface device. The AR target object surface information is assembled using the target object surface information and is configured for viewing in conjunction with a real-time view of the target object captured by the mobile interface device. The method also comprises transmitting the AR target object information to the mobile interface device.

Another illustrative aspect of the invention provides an automated system for providing information to a mobile interface device for use in conducting an operation on a surface of a target object in a dynamic structural environment. The system comprises at least one mobile interface device configured for variable disposition within the dynamic structural environment, capturing information about the target object within the structural environment, and transmitting the target object information over a network. The system also comprises a local positioning system in communication with the at least one mobile interface device via the network and configured to provide information usable to determine a mobile interface device pose relative to the target object. The system further comprises a central processor comprising at least one data processing machine in communication with the at least one mobile interface device and the local positioning system via the network. The central processor is configured for receiving from a requesting one of the at least one mobile interface device a request for target object surface information, the request including information usable to determine the mobile interface device pose relative to the target object, determining the pose of the requesting mobile interface device relative to the target object, and obtaining target object surface information for one or more measurable target object characteristics. The central processor is further configured for assembling augmented reality (AR) target object surface information for transmission to and display on the mobile interface device. The AR target object surface information is assembled using the target object surface information and is configured for viewing in conjunction with a real-time view of the target object captured by the mobile interface device. The central processor is still further configured for transmitting the AR target object information to the mobile interface device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides methods and systems for real-time display of AR information on a mobile device immersed in and movable within a dynamic environment. The challenges presented by this scenario include determination of the location of and orientation of the mobile device within the environment, recognition of variations in the spatial geometry of the environment, and detection/identification of changes in other measurable parameters associated with the environment or objects within the environment.

While the invention will be described in connection with particular embodiments, it will be understood that the invention is not limited to these embodiments. On the contrary, it is contemplated that various alternatives, modifications and equivalents are included within the spirit and scope of the invention as described.

While the dynamic structural environments used in many of the examples and illustrative embodiments used herein to describe the invention relate to ships and other vessels, it will be understood that the invention is not limited to such environments. The invention can be used in, without limitation, land vehicles, buildings and any other static or dynamically variable structure.

The systems of the invention use AR as the primary medium for presenting environment-related information to a user. AR allows presentation of such information on the mobile interface device in graphical or textual form overlaid or adjacent an environmental area or object as it appears in the camera-generated view on the device screen.

Figure 1:
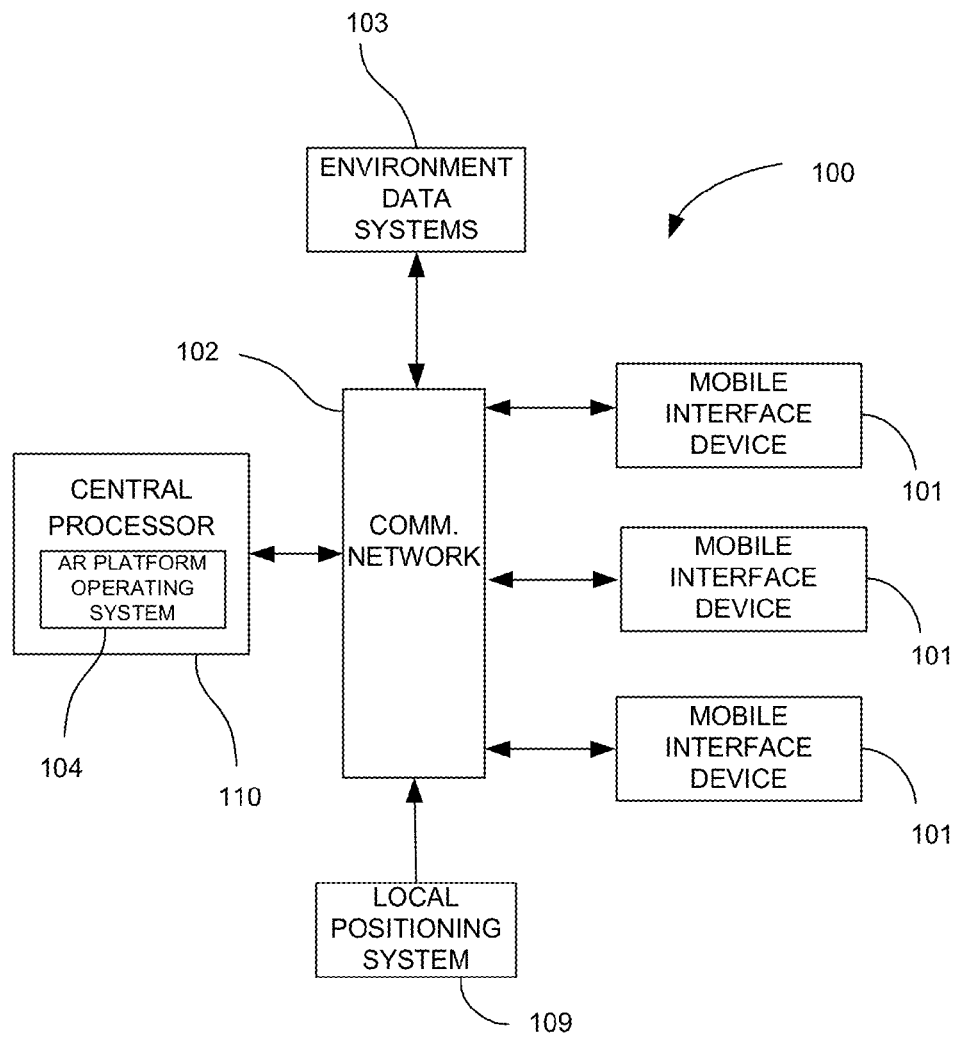
FIG. 1 is a schematic representation of a system for providing AR information to a mobile interface device according to an embodiment of the invention.

A generalized system 100 for generating and displaying real-time AR information according to an embodiment of the invention is illustrated in FIG. 1. The system 100 is configured for obtaining and storing information on a dynamic structural environment such as a ship or building and objects disposed within that environment. The system 100 comprises a central processor 110 in communication with one or more mobile interface devices 101 via a communication network 102. The central processor may include or be in communication with a relational database structure (not shown) as is described in U.S. patent application Ser. No. 14/210,650 (the "'650 Application), filed on Mar. 14, 2014, the complete disclosure of which is incorporated herein by reference in its entirety. In general, the central processor 110 is configured to receive captured object information from the mobile interface devices 101 and to extract information relating to the environment or an object in the environment, generate AR information for display on a requesting mobile interface device, and transmit the AR information to the requesting mobile interface device 101.

The central processor 110 may include or be configured to receive information from a local positioning system 109 via the communications network 102 or a different network. The central processor may be configured to use the information from the local positioning system 109 in conjunction with information from a requesting mobile interface device 101 and known/stored structural information (e.g., a three dimensional model) to determine the pose of the mobile interface device 101 within the environment. As used herein, "pose" means the position (x,y,z) and orientation ($\theta,\varphi,\zeta$) of an object in a particular physical space. The system is configured to resolve spatial differences between the coordinate system established based on the known structural information and the data received from the local positioning system 109 that result from changes in the dynamic structure.

The central processor 110 is also configured to receive information from an environment data system 103 via the network 102 or another network. The environment data system 103 is configured for measurement or determination of parameters associated with the structural environment or an object or objects within the structural environment. As will be discussed in more detail, such parameters may include, but are not limited to spatially mapped or mappable data obtained from sensors (e.g., radiation or temperature sensors) with known locations in the structural environment, spatially mapped or mappable data (e.g., weight distribution or surface topography) associated with a particular object in the environment, and system or device status information (e.g., electrical circuit energization status). In some embodiments, the environmental data systems 103 may include a metrology system adapted to provide measurements of specific parameters for particular object types. The central processor 110 is configured to process information from the environmental data systems 103 and use it with the pose information for the requesting mobile interface device 101 to generate AR information that can be transmitted to the mobile interface device 101 for display.

In various embodiments of the invention, information processed by the central processor 110 may include asset location information from a global or local positioning system, visual or graphical information received from the mobile interface devices, observational information from users, and operational or other data from instrumentation systems associated with the environment or particular assets. Any or all of such information can be used by the central processor 110 to update object-related information and/or generate information for display via AR images that can be superimposed on the mobile device user's view of the environment or an object in the environment. The mobile interface devices used in the systems of the invention can make use of AR in a variety of ways that allow the user to conduct inspection, maintenance, repair, and replacement tasks in relation to particular assets. AR can also be used to assist a user in identifying safety hazards, locating objects, or simply navigating within the dynamic environment.

In some embodiments, the central processor 110 may be configured for processing information it receives for a particular object or structure in the environment and comparing that information to desired specifications or previously obtained information for that object or structure. Such information can be used to determine if a maintenance or other corrective operation should be performed. The central processor 110 may also be configured to generate AR representations of a deviation from the desired condition that can be displayed to mobile device user charged with correcting the deviation. As will be discussed in more detail hereafter, this could include any of various maintenance operations or corrective machining operations. In some embodiments, the environment data systems 103 may be configured to provide periodic or continuous updates to the central processor 110 regarding the status or condition of the object or structure undergoing such operations. This allows the central processor 110 to provide condition updates to the mobile device operator in real-time.

The mobile interface device 101 may be any mobile computing solution that is used by a user to facilitate communication with and display information from the central processor 110. The mobile interface device 101 may be, for example, a tablet computer, a smartphone, or a wearable heads-up display. The mobile interface device 101 may have features including, but not limited to a processor, a display (such as a screen), a vision sensor (such as a camera), a microphone, one or more speakers, and wireless communications capabilities. The mobile interface device 101 may be, in a particular embodiment, a wearable head-mounted device (HMD) such as that described in U.S. application Ser. No. 14/210,730, filed Mar. 14, 2014, the complete disclosure of which is incorporated herein by reference in its entirety. In preferred embodiments, the mobile interface device 101 is equipped or configured to display AR images/information to a user. The mobile interface device 101 may include one or more accelerometers or other motion detection sensors. Each mobile interface device 101 may include one or more unique identifiers. In some embodiments, some or all of the mobile interface devices 101 may include one or more local positioning receivers, image and object recognition, audio queues, or electromagnetic field (EMF) receivers or detectors (for GPS, WiFi, or RFID reception or light detection).

In some embodiments, the mobile interface device 101 may be configured to receive information from the local positioning system 109 and to determine its own pose relative to the environment. This capability may be provided to the mobile device 101 in addition to or instead of configuring the central processor 110 to establish the pose of the mobile device 101.

The communication network 102 may be a wireless network, a wired network or any combination of wireless network and wired network. In a preferred embodiment, the communications network 102 is a wireless communications network, allowing the mobile interface devices 101 to communicate wirelessly with the central processor 110. The communication network 102 may, in particular, be or include a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal.

The central processor 110 may be or comprise one or more servers, data processing machines, or network-enabled computers and may host an AR operating system 104. The AR operating system 104 may be configured to control the interaction of the hardware and software components of a relational database structure (not shown). The relational database structure is configured to provide a logical framework that allows digital information to be associated with physical objects. This framework includes addresses for both tangible objects as well as individual point addresses within a coordinate system for the structural environment. In an exemplary embodiment, this coordinate system is based on a three dimensional (3D) structural model of the environment (e.g., the ship or building). Preferably, the 3D model provides a complete detail of the environment including every space, room or compartment where objects may be disposed.

The AR operating system 104 is configured to assemble AR information for transmission to and display by the mobile device 101. The AR information is constructed using the processed environment data from the environment data systems 103 and the pose of the mobile device 101 using any of various techniques known in the art. The AR information may be presented for display as text or as graphical images that can be superimposed over real-time images captured by the mobile device 101. The AR information may be associated with specific parameters relating to the portion of the environment where the mobile device 101 is located or relating to an object or system near the mobile device 101 and/or with which the user of the mobile device 101 is interacting.

In particular embodiments, the AR information may include information on a target object that is usable by a mobile device user to conduct maintenance, construction, machining or other operations on the target object. As used herein, the term "target object" means an object or structure in a dynamic environment that can be identified by the system and associated with location, status, condition or other object-related information. In particular, the AR information may include information on deviations from a desired status or condition. In some embodiments, the AR information may be presented on a mobile device as an AR image superimposed over a camera image of the target structure or object to show physical deviations to the user in a clear visual manner.

The central processor 110 may be configured or may comprise a processor or processing module and computer executable software (e.g., on a tangible computer-readable medium) configured to perform various processing functions relating to object recognition, including feature extraction to extract lines, edges, ridges, or other localized interest points from an image; detection or segmentation to select a specific set of interest points within an image or segment multiple image regions that contain a specific object of interest; image recognition to categorize a detected object into a particular category; noise reduction; contrast enhancement; and/or space scaling, for example.

The relational database structure may include a domain coordinate management system that maintains spatial addresses for all spaces within the domain of the structural environment. The domain coordinate management system may be configured to receive spatial address information from both the local positioning system 109 and from the three dimensional structural model. The domain coordinate management system is configured to resolve spatial differences between the coordinate system established by the 3D model of the structure and any available telemetry data received from the local positioning system 109 as a result of changes in the dynamic structure. Such differences may be particularly significant in, for example, a large vessel underway at sea. Ships (particularly large ships) are not rigid bodies.

The local positioning system 109 is a system (complete or composite) that facilitates the establishment or estimation of the pose of a mobile interface device 101 within the coordinate system described or approximated by the three dimensional model of the structural environment. As is discussed in more detail in U.S. application Ser. No. 14/210,601, filed Mar. 14, 2014 (the "'601 Application"), the complete disclosure of which is incorporated herein by reference in its entirety, pose may be accurately established using vision science-based algorithms. Such algorithms may recognize one or more unique pre-identified visual tracking cues within a physical space.

The local positioning system 109 may be or include any system capable of establishing the position and/or orientation of a mobile interface device relative to a structural environment coordinate system. This coordinate system may be, or may be based on, for example, a predetermined reference system for a ship or other structure. In some embodiments, the local positioning system 109 may comprise a light positioning system that operates by using light points positioned throughout the physical spaces of the vessel. An example of a light positioning system is described in U.S. Pat. No. 8,248,467, the complete disclosure of which is incorporated herein by reference in its entirety. In some embodiments, the local positioning system 109 may use electromagnetic or sound waves emanating from various points within the physical spaces in the structural environment. Examples of electromagnetic or sound waves include radio frequency identification (RFID) signals, radio signals, WiFi signals, audio tones, and/or sound waves. The local positioning system 109 may use unique images or recognizable visual features, quick response (QR) codes, bar codes, or reference points placed throughout the physical space of the structure.

The system 100 may use information from more than one local positioning system. Alternatively or in addition, the system 100 may receive and use information from a global positioning system (GPS) (not shown).

It will be understood that various processing components of the system 100 may be combined into a single processor or further subdivided into multiple processors or servers. It will be appreciated that in some cases, multiple instances of a particular component of the system 100 may be used. Moreover, the system 100 may include other devices not depicted in FIG. 1.

Figure 2:
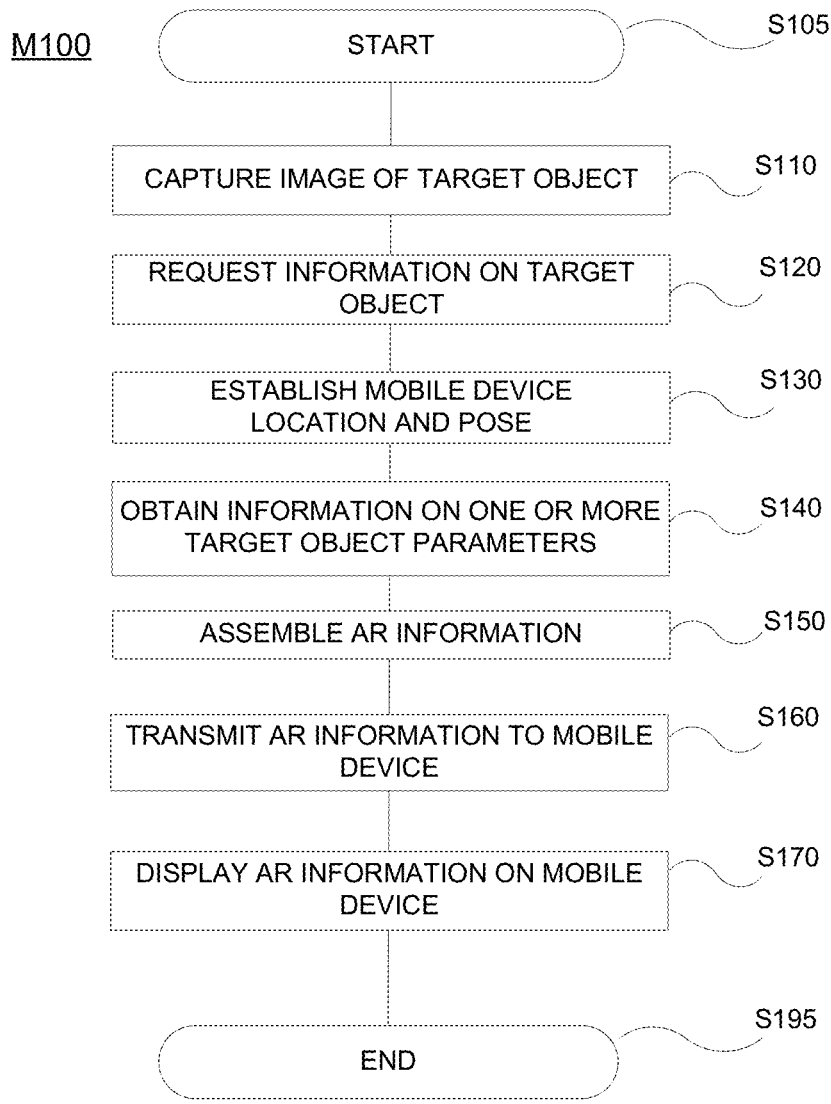
FIG. 2 is a flow diagram of a method of providing target object information to a mobile interface device in a dynamic structural environment according to an embodiment of the invention.

The system 100 can be used to provide a mobile device user with real-time AR information on the characteristics or condition of target objects disposed in a dynamic environment. With reference to FIG. 2, a generalized method M100 for providing such AR information to a mobile device user begins at S105. At S110, the user uses the mobile interface device 101 to capture a digital image of the target object and/or a portion of the environment in which the target object is disposed. At S120, a request for target object information is sent from the mobile interface device to a central processor 110 over a network 102. The request may include information usable by the central processor to determine the exact location and pose of the mobile interface device 101 relative to the target object. This information may include some or all of the digital image. At S130, the central processor 110 uses the request information along with information from the local positioning system 109 to establish the exact location and pose of the mobile device 101 relative to the target environment. In some embodiments, the pose of the mobile device 101 may be determined by the mobile device 101 itself. In such embodiments, pose information may be transmitted by the mobile device 101 to the central processor 110.

At S140, the central processor 110 obtains information on one or more target object-related parameters. Some or all of this information may be received from the environment data systems 103 or determined from information received from the mobile device 101 and/or the mobile device user. The information could, for example, be determined from a digital image received from the mobile device 101 as part of the information request. Alternatively, the information may be data from sensors located near or on or associated with the target object. The information may also be or include information on the status of a system of which the target object is a part. It will be understood that the information from the environment data systems 103 may be provided to the central processor 110 on a constant basis or may instead be provided in response to a request or query submitted by the central processor 110. The central processor 110 may also obtain previously stored information associated with the target object from a data storage module.

It will be understood that as part of or in addition to the action of obtaining target object information, the central processor may be required to process the information received from the mobile interface device 101 to specifically identify the target object and differentiate it from other objects in the environment. In some embodiments, this may be accomplished using object recognition techniques in conjunction with environment location information. In other embodiments, this may be accomplished through the use of unique identifiers or other indicia applied to or attached to the target object. Such indicia can be provided to the central processor 110 by the user or can be extracted from a captured digital image. Among other things, identification of the target object allows the central processor 110 to determine if previously stored information is available for that target object.

In some embodiments. the target object parameter information may include information on a particular characteristic or status that can be evaluated to determine if an operation should be performed on the target object by the mobile device user. In some cases, if it is determined that a maintenance or corrective operation is required or if it is already known that such an operation is required, the target object information may be information required by the mobile device user to perform the required operation.

At S150, the central processor 110 uses the target object information to assemble AR information for transmission to the mobile interface device 101. This action may include processing of raw data from the environment data systems into a form usable by the AR operating system 104 to construct the AR information. In some embodiments, the AR information includes a graphical representation of target object parameters as a visual display that can be superimposed over a real-time view of the target environment captured by the mobile interface device 101.

In some embodiments, the central processor 110 may be configured to determine the deviation of a current target object status or characteristic from a desired target object status or characteristic. This could, for example, be a deviation of measured performance or geometric parameters from what is specified for the target object. The central processor 110 may use this information to construct the AR information. In an exemplary embodiment, the AR information could include an AR image that visually shows the deviation in conjunction with a real-time view of the target object. In some embodiments, the AR information could be or include a visual representation of the desired target object condition to assist the mobile device user in conducting an operation intended to bring the target object in conformance with that desired condition.

At S160, the central processor 110 transmits the AR information to the mobile interface device 101 where it is displayed to the mobile device user at S170. The method ends at S195.

As previously discussed, the AR information may be presented as text displayable in conjunction with the visual display of the target object or as graphical imagery that can be superimposed over an appropriate portion of the visual display. The graphical imagery could, for example, be or include one or more graphical representations of the parameters measured by the environmental data systems, a representation of desired characteristics, or the above-described deviation from desired characteristics.

It will be understood that, once requested, some or all of the actions of the method M100 may be repeated to periodically or continuously provide real-time target object information to the mobile interface device 101. This assures that the user is aware of variations due to changes in the location and pose of the mobile device relative to the dynamic environment and changes target object parameters. In some embodiments, the actions of obtaining target parameter data, assembling AR information and transmitting the AR information may be repeated after some or all of an operation on the target object has been accomplished. This allows the operator to monitor the effect of the operation being conducted on the object.

The methods of the invention are usable by individuals conducting virtually any operation associated with an object, including without limitation any form of machining, welding, construction, assembly, or maintenance operation. It may also include instances where a status of the object is changed. An example of this is an instance where the object is a component in an electrical circuit and the operator is required to effect a change in the connectivity or energization status of that component.

Of particular interest are operations involving direct modification or correction of target objects. This includes instances where an operation is required to bring a particular part or surface to a desired geometry or condition. The methods of the invention can be used to assist in any such operation, but have particular facility in shipboard operations such as those required for surface protection operations. As used herein, the term surface protection operations means any cleaning, material removal or material application process relating to establishing or maintaining a desired condition on a structural surface.

The present invention provides systems and methods for providing detailed AR information to mobile device users conducting, assisting or supervising surface protection operations including without limitation application or removal of paint and other coatings, chemical treatment, insulation application or removal, and cleaning tasks. The AR information provided to a user may include visual maps, surface area and other surface characteristics, covering material information, coating thickness data, and flaw locations. It may also include task-specific information such as location and area of surfaces to be coated, surface preparation requirements, material requirements, thickness requirements, inspection requirements, task instructions, and troubleshooting tools.

The methods of the invention may be applied to any portion of a dynamic structure. For ships and other vessels, different compartments and exterior portions require different kinds of coatings including, but not limited to paint, insulation, and deck covering. Testing of these coatings is necessary during construction to assure that specifications are met and to identify where corrective measures are needed. The present invention can provides workers with easily viewed and understood representations of the design configuration for protective coatings, the as-built or measured configuration of such coatings, and the discrepancies between the two configurations.

The utility of the invention in painting operations is readily apparent, but the invention is applicable in other protective coating operations as well. In an illustrative example, a surface protection operation on a ship's rudder may require the application of a fairing compound (i.e. a thick epoxy putty) to smooth out contours to minimize any cavitations of water that could accelerate erosion of the rudder. The system and methods of the present invention can be used to aid in determining the amount of putty to apply, where to apply it, and in what shape.

While the primary examples and illustrative embodiments used herein to describe the invention relative to paint, insulation, and deck coverings for ships and other vessels, it will be understood that the invention is not limited to such structures and environments. The systems and methods of the invention can be used without limitation in any construction or maintenance environment where any surface protection operation is performed. The Society for Protective Coating (SSPC) has produced many of the core standards used in the protective coatings industry. Many of the SSPC Surface Preparation (SP) specifications form the basis for good coating practice and those cited herein are hereby incorporated by reference and maybe implemented in various applications of the invention.

Figure 3:
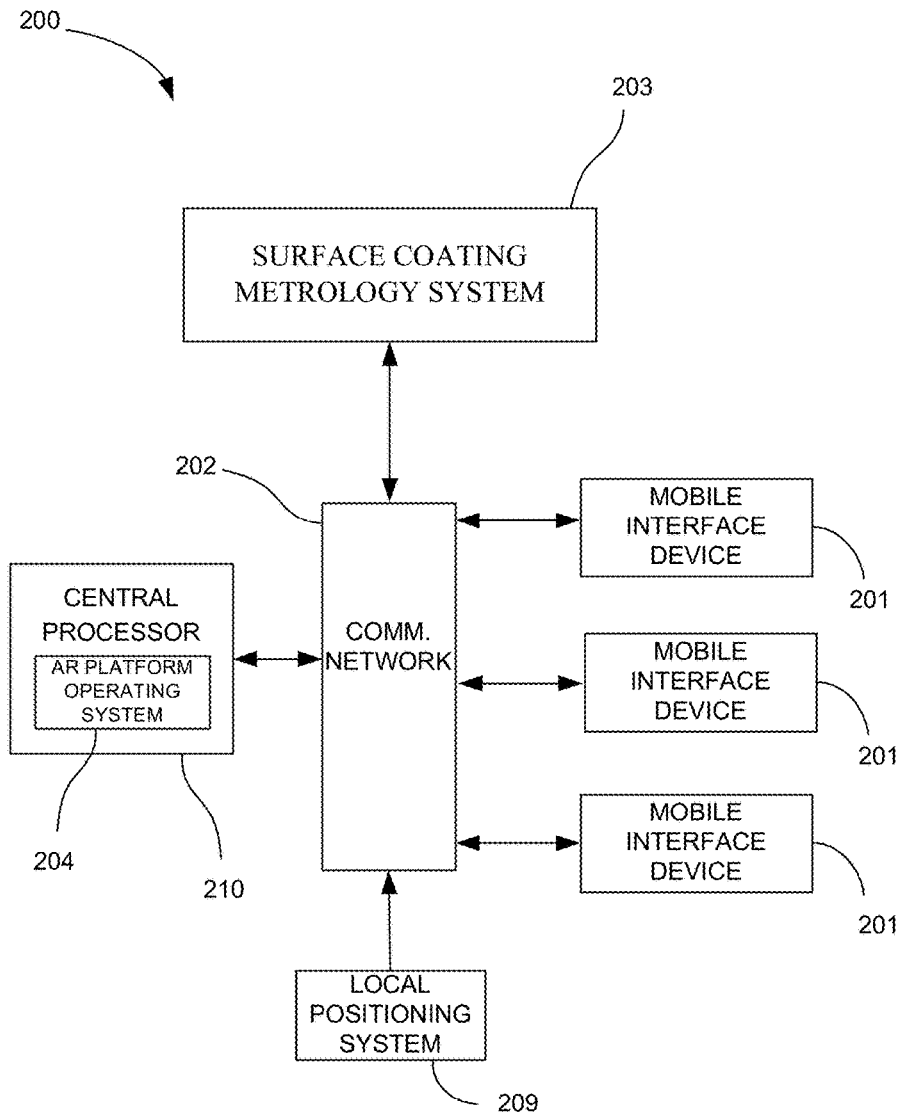
FIG. 3 is a schematic representation of a system for providing target object surface information to a mobile interface device according to an embodiment of the invention.

FIG. 3 illustrates a surface protection operation display system 200 according to an embodiment of the invention that can be used to assist in various surface protection operations on a surface or portion of a surface of an object or structure in a dynamic environment. The system 200 is essentially a specific variation of the generalized AR display system 100 of FIG. 1. It is noted that system 200 illustrates only a single instance of each component. It will be appreciated that multiple instances of these components may be used and that the system 200 may include other devices not shown in FIG. 3. It will be understood that in many environments, the system 200 will interface with other systems such as, for example, the operating system of a shipboard operations and maintenance platform as described in the '650 Application.

The system 200 comprises a central processor 210 in communication with one or more mobile interface devices 201 via a communication network 202. The mobile interface device 201 may be any mobile computing solution that is integratable into the system 200. The mobile interface device 201 may be, for example, a tablet computer, a smartphone, or a wearable heads-up display. The central processor 210 may include or be in communication with a relational database structure (not shown) as described in the "'650 Application. The central processor 210 may be configured to receive information from a local positioning system 209 via the communications network 202 or via a different network and use such information along with information from a mobile device 201 to determine a pose of the device 201 relative to a target object.

The central processor 210 is configured to receive captured target object information from the mobile interface devices 201 and to extract information relating to the target object, generate AR information for display on a requesting mobile interface device, and transmit the AR information to the requesting mobile interface device 201. The target object may be a discrete object in the environment or a structure or a portion of a structure in the environment. The surface may be an exterior surface of the object or structure or, in some cases, an interior surface such as an interior wall of a ship compartment. In typical shipboard applications, all spaces within the ship will be included in the environment coordinate system and specific locations for surface protection operations (e.g. stud weld positions, putty on rudders, installations of insulation or zinc anodes, location of dry film thickness (DFT) readings or other qualitative or quantitative measurement) will be readily identifiable.

The central processor 210 is also configured to receive surface measurement information via the network 202 (or another network) from a surface metrology system 203. The surface metrology system 203 may be or include any one or more measurement systems for locating and measuring surface or surface coating parameters discretely or continuously. The surface metrology system 203 may, for example, be or include a paint, insulation, and deck covering metrology system comprising sensors (e.g., electronic and magnetic pull-off gages) for measuring substrate/surface roughness and/or DFT of a dry coating. It may also comprise instrumentation such as digital photogrammetry, computerized theodolites systems, total stations, laser trackers, and coordinate measuring machines to make three-dimensional surface measurements. In some embodiments, the surface metrology system may provide information relating to substrate or surface structure (e.g., stud position) as well. Sensors and instrumentation of the surface metrology system may be automated or may be operated manually. Data provided by the surface metrology system 203 may be processed in real-time or later processed after all target points are measured. A translator (not shown) may be used to convert sensor readings into digital signals compatible for standard transmission over the communication network 202.

The surface metrology system 203 may use a combination of laser, theodolite, photographic, optical telescope and other data to map surface topography in three dimensions. This information can then be provided to the central processor 210 along with any other surface or coating measurements. The central processor 210 may be configured to receive the surface and coating measurement information and compare it to specified surface parameters for the target object. The central processor is further configured to determine the deviation between the measured surface parameters and the desired surface parameters. These deviations may, for example, relate to coating thickness or location discrepancies.

In some embodiments, the surface metrology system 203 may be used to determine surface measurement and/or discrepancy information and transmit such information directly to the one or more mobile interface devices 201 in addition to or instead of the central processor 210 via the communication network 202.

In some instances, when qualitative or quantitative measurements do not require electronic equipment, or the electronic equipment is not conducive to wireless transmission that identifies the location where the measurements were taken, the location of particular measurements or other operations may be documented by manual input into the surface coating metrology system 203. A graphic indicator may be used to document measurement locations by using a cursor to mark the location on an augmented reality map (e.g., on a mobile interface device 201), or if the screen is a smart screen, the location can be identified by marking the position with one's finger or a pointer.

The central processor may be configured to use the surface measurement and/or the surface discrepancy information along with pose information for the requesting mobile interface device 201 to generate AR surface information that can be transmitted to the mobile interface device 201 for display. Such AR surface information may include, for example, an AR image of the desired surface or surface coating condition or a graphical representation of the differences between the desired and actual conditions.

Figure 4:
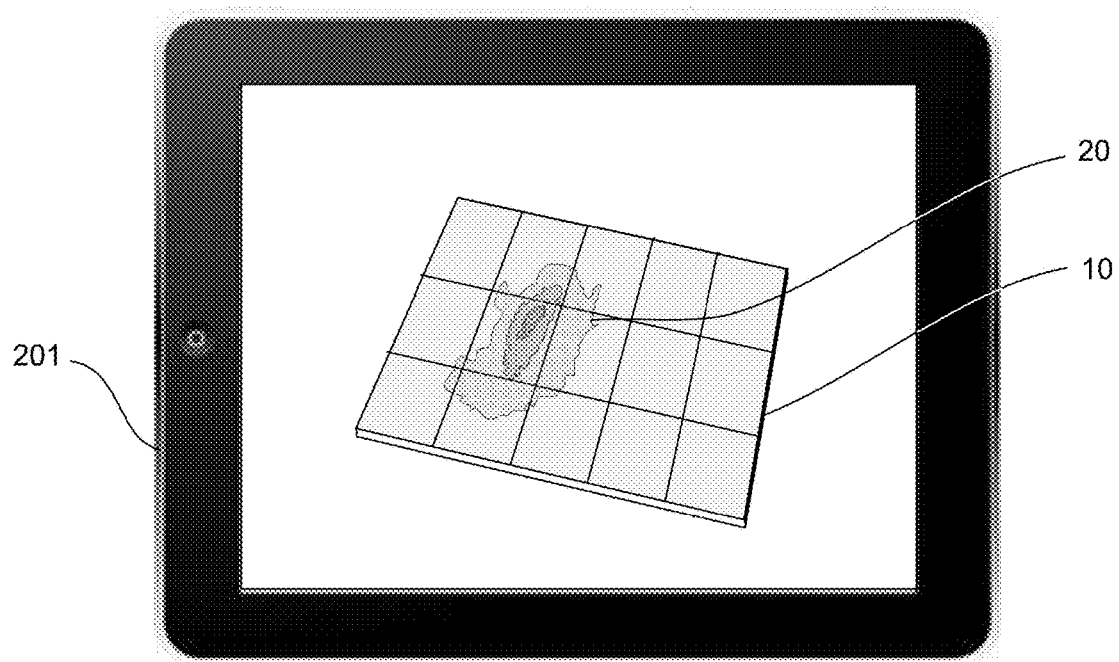
FIG. 4 is an illustration of a mobile interface device user having a target object and exemplary AR surface deviation information displayed thereon in accordance with an embodiment of the invention.

The central processor may be configured to provide the AR information in a wide variety of forms. Visual contour style displays may be provided that show out-of-tolerance areas by the intensity of color and/or the closeness of contour lines. As shown in the exemplary mobile device display depicted in FIG. 4, an AR image 20 of surface coating thickness deviations from the desired surface coating thickness for a target object (in this case, a planar floor panel 10) could take the form of a topographical map in which variations in predefined ranges are represented by color density variations. In the illustrated example, the tone density of the illustrated regions are darker for larger deviations from the desired surface coating thickness.

Figure 5:
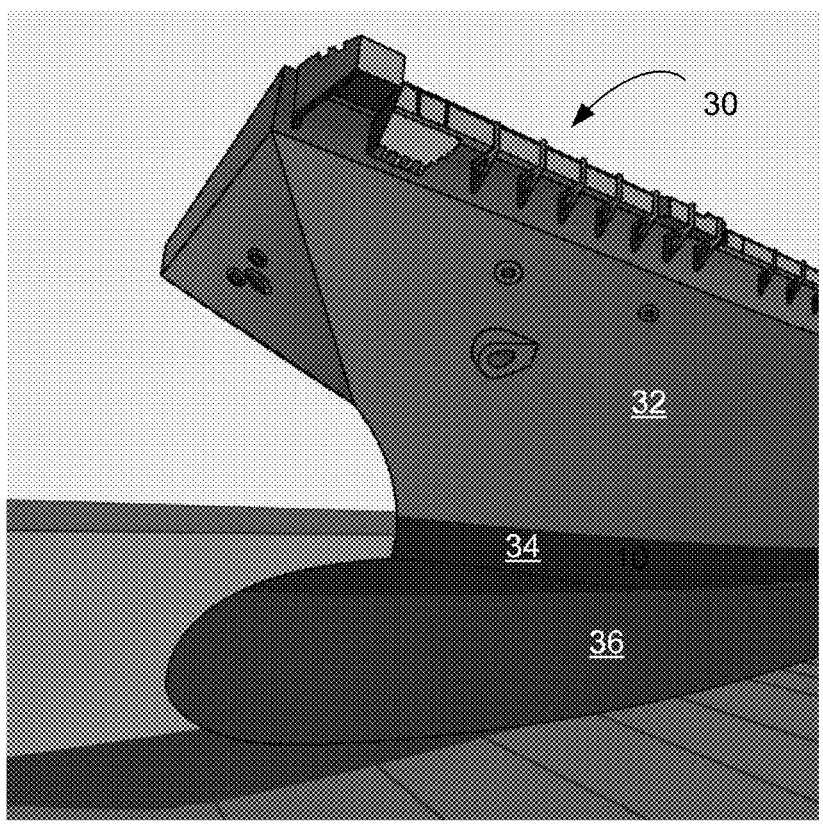
FIG. 5 is an illustration of a three dimensional target object having discrete surface regions for coating application.
Figure 6:
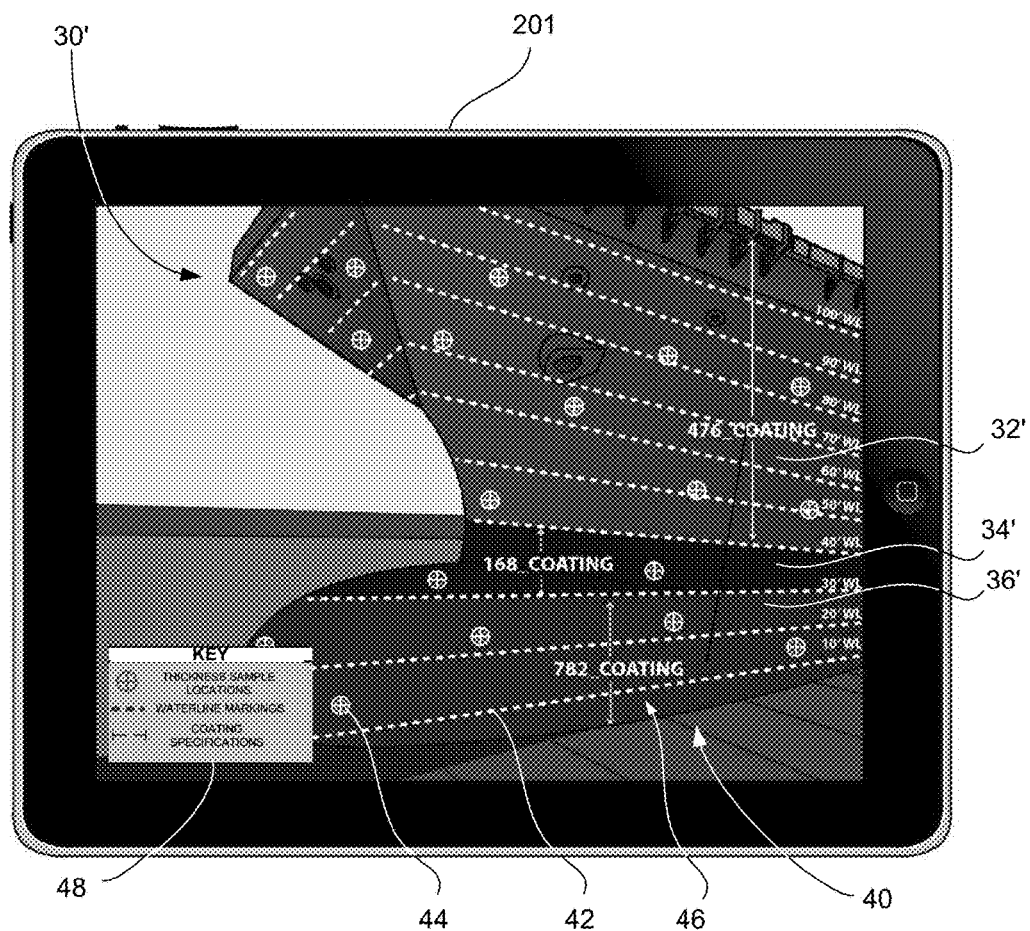
FIG. 6 is an illustration of a mobile interface device user having a camera-captured view of a target object and overlaid AR surface information displayed thereon in accordance with an embodiment of the invention.

AR surface information may also be or include specific text or other information pertaining to the desired surface coating condition or to a sequence of operations needed to correct a discrepant condition. In another variation, the AR surface information may include a 3-dimensional augmented image of the proposed design overlaid on the as-built design in the correct pose, thus allowing the worker to visualize in real-time or near real time where a surface coating is to be applied, removed, or modified. In some cases, an AR image may contain both graphical and textual surface information. FIG. 5 illustrates a ship structure 30 having a complex three dimensional surface divided into three areas 32, 34, 36 each having its own surface characteristics and coating requirements. FIG. 6 illustrates a camera-captured view 30' of the ship structure 30 displayed on a mobile interface device 201. Superimposed over the captured image is a three dimensional AR image 40 comprising a variety of AR surface information including graphical representation of hull waterlines 42 and coating thickness measurement locations 44, as well as textual information 46 relating to coating identification and requirements all superimposed over the imaged surface areas 32', 34', 36'. The illustrated example also includes an inset 48 showing a key to the displayed information. In some embodiments, different surface area portions (such as areas 32', 34', 36') could be shown in the AR image in different shades or colors relating to the desired coatings to be applied to those areas. For paint coatings, these colors could be similar to or the same as those of the actual paint coatings to be applied.

It will be understood that the methods of the invention are usable in any type of surface protection operation to allow a worker to visualize the desired configuration and/or the difference between what was expected or required (e.g., by drawing or 3D model) and a measured condition. The measured condition may be compared to a 3D model, or other representation of the intended design, for example, and the resulting information may be visually provided to a worker through augmented reality in real time so that corrections may be made during the process.

It can therefore be seen that the present invention provides the ability for a worker to use a mobile interface device to visualize areas to which coatings are to be applied and/or out-of-tolerance or mislocated areas on the surface of an object without having to physically compare measurements to those set forth in drawings or other specifications. The system 200 provides the worker with a visual representation in two or three dimensions that can be superimposed over a real-time camera view of the surface using augmented reality display techniques. Workers may use this visualization to determine where coatings are to be applied, corrections are to be made or removal/cleaning operations are to be conducted and what methods to follow to bring the surface to the desired condition.

Figure 7:
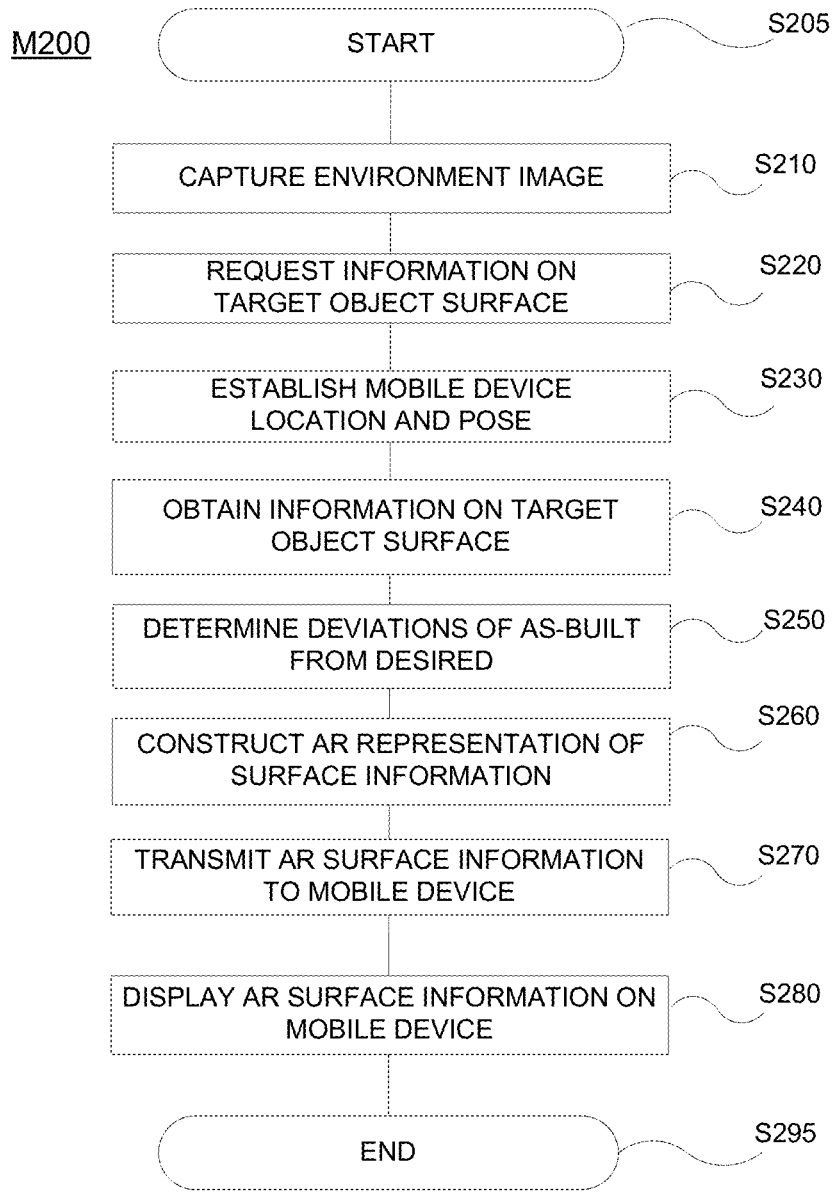
FIG. 7 is a flow diagram of a method of providing target object surface information to a mobile interface device according to an embodiment of the invention.

With reference to FIG. 7, an exemplary method M200 uses surface protection operation display system 200 to provide surface information to a mobile device user. The method begins at S205. At S210, the user uses the mobile interface device 201 to capture a digital image of a target object or a portion of a target object having a particular surface of interest. At S220, a request for information on the target object surface is sent from the mobile interface device 201 to the central processor 210 over the network 202. The request may include information usable by the central processor 210 to determine the target object and the surface of interest and to determine the exact location and pose of the mobile interface device 201 with respect to the target object. The information sent from the mobile interface device 201 may include some or all of the captured digital image of the target object. At S230, the central processor 210 uses the request information along with information from the local positioning system 209 to establish the exact location and pose of the mobile interface device 201 relative to the target object. In some embodiments, the pose of the mobile device 201 may be determined by the mobile device 201 itself. In such embodiments, pose information may be transmitted by the mobile device 201 to the central processor 110.

At S240, the central processor obtains information on the target object surface characteristics. This may include recalling previously stored surface topography information and/or obtaining updated information derived from surface or substrate measurements (i.e., the "as-built" or current surface configuration). The information may include, in particular, existing coating material characteristics and/or thicknesses. It may also include information on a base/design configuration or a specified/desired surface configuration or topography. The current surface characteristics may be established using contemporaneous surface measurements or based on measurements previously provided to the system. Such measurements may include for example thickness information at various locations on the surface. The measured surface information can be provided in terms of the spatial location within the established environment coordinate system. Measurements may be taken dynamically using any suitable measuring system including, but not limited to any of the surface metrology measurement systems previously disclosed.

At S250, the target surface information may be used to establish surface characteristics and/or to compute deviations between current surface configuration and a desired surface condition. Such deviations may be, for example variations in thickness within a particular surface region or variations in location and boundaries of a particular surface area region. This can be done for specific points or areas on the target object surface. It will be understood that there are some instances where it may be desirable to continuously or periodically re-measure current surface characteristics and re-determine the current deviations from a desired topography. This allows, for example, an operator to see the effect of his corrective operations on such deviations and/or the occurrence of new deviations caused by such corrective efforts.

It will be understood that in some cases, there is no need to determine the actual surface deviations. For example, there are some instances where it is sufficient to provide information on the desired surface condition/topography only. In such cases, S250 can be omitted.

The central processor may also obtain information on environmental conditions for the environment in which the target object is located. In a preferred embodiment, such information is received from an environment data system configured to measure and provide environmental parameter data in real time or near real time. Of particular interest are environment parameters that could affect a particular surface operation. Such parameters could include, for example, target object surface temperature, ambient air temperature, atmospheric pressure, wind direction and speed, relative humidity, and dew point. Environment parameter information can be used by the central processor to construct graphical or textual AR environment information can be displayed on the mobile interface device.

At S260 a rendering engine on the central processor 210 uses the target object surface information (measured characteristics, desired characteristics, and/or deviations from desired characteristics) along with mobile device pose information to construct an AR representation of the target object surface information of interest. In preferred embodiments, this includes graphically rendering a visual display that can be superimposed over the view of the target object surface captured by the mobile interface device 201 as illustratively shown in FIG. 6. The display may be in the form of a surface density diagram, topographical maps, colored areas varying in size and color to indicate location and extent of discrepancies or target regions for particular operations, or other notional user view of surface area characteristics. The AR representation may also include text as previously described. At S270, AR surface information, which is or includes the AR representation constructed in S260, is transmitted to the mobile interface device 201. AR environment information can be transmitted to the mobile interface device as well. At S280, some or all of the AR surface information and/or AR environment information is displayed on the mobile interface device 201 as shown in FIG. 6. In preferred embodiments, the graphical AR rendering of the surface information is superimposed over the displayed image of the target object surface so that the user is able to easily view the desired surface characteristics, the surface deviations, or other desired information. The method ends at S295.

It will be understood that, once requested, some or all of the actions of the method M200 may be repeated to periodically or continuously provide real-time target object information to the mobile interface device 201.

The present invention may utilize any of the aforementioned or other methods available for providing surface protection operation information to a worker in a maintenance or construction environment. The paragraphs that follow describe particular operations in which these methods can be used and the form in which surface information may be acquired and used.

Painting/Coating Operations

Paint information may be preprogrammed into the mobile interface device 201 or may be retrieved from storage by the central processor 210. Paint information may include various procedures and the chronological order of events for a particular preservation or surface protection process to be conducted. The paint information may include, for example, information on the intended surface area, areas requiring protection during an operation, cleanliness requirements, required surface testing, environmental condition limitations, surface preparation procedures and materials, profile requirements, characteristics and requirement for the paint/coating to be applied, coating thickness, and flaw identification criteria. the following paragraphs describe these forms of information in more detail. It will be understood that these sub-operations are not necessarily in chronological order and that other operations may also be involved (e.g., a cleanliness inspection may be required at various stages).

Surface Area Information

Information: Boundaries, location and surface area in squared units (English or metric) of area to be painted. The surface information may include a visual representation of the area to receive a coating including the edges or boundaries to be coated and the specific coating to be used and may be supplied to the user through mobile interface device 201.

Validation: The dimensions and location of the area to be painted will be calculated and mapped in three dimensions. The system 200 will calculate an accurate surface area to be painted, including bulkheads, stiffeners, piping, etc. The calculated surface area will be displayed visually on the mobile interface device 201 and may be compared to the preprogrammed surface area to validate the accuracy of the area. If the area does not match within a specified allowance of error, the user may be alerted so corrections can be made.

Surface Protection

Information: A visual map of specific items that need to be protected from blasting and coating will be identified by color coding or other means through mobile interface device 201, and any requirements for foreign material exclusion devices (FMEDs) may be supplied. Other information may include cleanliness requirements for specified areas.

Validation: The location and surface characteristics of the target area are established as previously described. Once protective materials are in place, a visual representation of the target object or space may be overlaid on a camera-captured image of the target object or space using mobile interface device 201. For example, the blast and coating protection and FMEDs may be color coded or have identifying shapes affixed, such as diamonds or squares that would be recognized in a scan as the protection required. The protected area may be deemed satisfactory or unsatisfactory based on the placement of the protection in comparison to where the protection was planned to be placed. If the area is unsatisfactory, corrective action would be required prior to proceeding in the coating process.

Cleanliness Requirements

Information: The requirements for cleanliness, e.g. through SSPC-SP 1 or potentially the use of a Fourier Transform-Infrared Spectroscopy (FT-IR) analysis may be visually represented on the surface using mobile interface device 201.

Validation: A visual inspection may be manually or wirelessly conducted and documented for a space or compartment using camera input. If FT-IR spectra are required to verify cleanliness of the surface, the surface coating metrology system 203, may be used to map the location of the FT-IR measurements taken manually or wirelessly in the space and verify the measurements are satisfactory. If the reading is unsatisfactory, the user may be warned visually through mobile interface device 201 and may be required to perform additional cleaning prior to additional measurements being taken.

Conductivity, Chloride, and Dust Tests

Information: The conductivity and chloride limits on bare metal based on design specifications may be determined and provided, along with dust test requirements, at the mobile interface device 201. Requirements for the location of readings may also be visually displayed (e.g. an AR image may include text indicating that one conductivity reading must be taken for every 200 square feet for the first 1,000 square feet, etc.).

Validation: The results of conductivity or chloride readings along with dust tests may be wirelessly or manually mapped via the surface coating metrology system 203, so that the location in the compartment where the readings were taken is documented, along with the number of readings. The locations of the measurements must meet the requirements set forth by design requirements as in for example SSPC-SP standards. If the measurements are unsatisfactory, additional cleaning would be necessary or approval of the departure from specification by the customer. The validation information would be communicated from the surface coating metrology system 203, to the mobile interface device 201.

Environmental Conditions

Information: The required environmental conditions for a particular surface protection procedure may be provided to the mobile interface device 201. The information may include, for example, surface temperature, ambient temperature, relative humidity, and dew point.

Validation: The environmental readings may be measured and recorded manually or automatically and transmitted wirelessly. Measurement locations may be mapped via the surface coating metrology system 203. The recorded temperatures, relative humidity, and dew points can be documented as satisfactory or unsatisfactory immediately. The user may be alerted through mobile interface device 201 of unsatisfactory conditions so corrective action can be taken. The validation information could be communicated from the surface coating metrology system 203 or the central processor 210, to the mobile interface device 201.

Surface Preparation

Information: Required surface preparation instructions or other information may be provided. This could include for example, the requirements of specified standards such as SSPC-SP 2 on piping, SSPC-SP 11 for hard to access surfaces, SSPC-SP 10 on bulkheads and overheads, etc. Locations where specific surface preparation operations are required or have already been conducted may be mapped.

Validation: The surface protection operation display system 200 may provide a visual overlay of the required preparations on the physical area prepared to verify that the specified compartment requirements match with the physical compartment. The validation information may be visualized using mobile interface device 201.

Blast Media

Information: This information may include materials and characteristics of qualified products for blast media that can be presented on the mobile interface device 201. In addition to specific locations where blast operations are required, a user may be provided information such as appropriate particle size of blast media, pressure, nozzle distance from surface, etc. that would result in the ideal surface profile to meet specifications. The amount of blast media required would be estimated based on the square feet of the area to be blasted.

Validation: Prior to blast operations, information on the blast media may be obtained and stored. The label of the blast material can be scanned and verified that it is included in the qualified products list via the surface coating metrology system 203. A sample of the blast media may be observed under a microscope which is capable of calculating the particle size. The results of the microscopic analysis will be entered into the surface coating metrology system 203, the central processor or an associated data storage medium, and the media may be deemed satisfactory or unsatisfactory. If the results are unsatisfactory, new blast material will be required or an allowance to use the out-of-specification media must be provided to the worker. The validation information may be communicated from the surface coating metrology system 203 or the central processor 210 to the mobile interface device 201.

Profile Data

Information: A specified coating profile (e.g. 2-4 mils on SSPC-SP 10 surface or greater than 1 mil on SSPC-SP 11 surfaces) and a number of required measurements based on surface area may be provided to the mobile interface device 201, along with the contractual rules pertaining to the measurements. For example, the rules may require that one profile reading be taken for every 200 square feet for the first 1,000 square feet, etc. If profile measurements are not required on particular surfaces in a target area, that information may be provided. For example, no profile readings are required on the gasket seating surfaces for manholes.

Validation: Profile measurements are obtained and mapped using the surface coating metrology system. Locations where profile measurements should not be taken are avoided. Severely pitted areas, for example, are generally not used for taking profile measurements. Such areas may be identified photographically and their locations mapped and stored. Pitted surfaces can also be identified and their location logged by manual input in the three dimensional map of the space. Any of various measurement tools may be used to obtain profile data. If profile tape is utilized to take the profile measurement, the area where the tape is applied can be mapped using the surface coating metrology system 203, and the profile measurement manually or wirelessly input. If profile measurements are taken with an electronic gage, the gage can wirelessly interact with the surface coating metrology system 203 to map the specific location where the profile measurement was taken and record the profile measurement. The number and location of profile readings will be satisfactory or unsatisfactory based on design requirements. If the readings or locations are unsatisfactory, corrective action must be taken, or permission to proceed with out-of-specification profile readings must be obtained. The information collected in the surface coating metrology system 203 may be communicated to the user on the mobile interface device 201 in real time or stored for later communication.

Coating System

Information: The coating system to be used for a particular operation may be specified in accordance with military or commercial specifications and the availability of qualified products. An estimate of the quantity of paint that is required based on the surface area to be painted may be provided in information supplied on the mobile interface device 201. The information provided may include color requirements for the cured paint such as L*a*b* values or other color specification. (The L* value is for how dark or light the color is. The a* value measures the amount of green and red and the b* value measures the amount of blue and yellow. The L*a*b* values can be calculated with the X,Y,Z values for colors.) Such information may be provided at the mobile interface device 201, along with expected resulting Fourier Transform-Infrared (FT-IR) spectra for the coatings. Some target areas require different paint in different areas. The different paint system requirements may be identified on a map of the areas such as that shown in FIG. 6. In another example, different types of piping on a ship may be color coded. For example, piping for jet fuel and potable water would be different colors, so that there is a visual indication of what is inside the pipes. Other variations include bilges that have different paint systems and color in the bilge wells, and bulkhead colors that vary depending on how close the bulkhead is to the walkway grating. In some cases, the funding source for a paint job is different, even though the same paint is being applied adjacently. The mobile interface device 201, can clearly identify the funding source for a paint job to allow a worker to know what charge to use for the job. For example, the sea chests and the underwater hull on an aircraft carrier receive similar coating instructions, but the funding sources for the projects are different.

Validation: Prior to conducting painting operations, information on the paint container can be scanned to verify it is a qualified product. Scanned information can be used by the surface coating metrology system 203 to verify characteristics and/or compare to an inventory list to ensure that the paint has not expired and is the correct color. After the target area is painted, the color may be verified by an algorithm that compares a photograph overlaid on the three dimensional map. Alternatively or in addition, a colorimeter could be utilized to measure the color. The location of the color measurement may be entered manually or automatically into the surface coating metrology system 203, to map and document the exact location of the measurements. Determination of whether the color is satisfactory or unsatisfactory can be made and transmitted to the mobile interface device 201. A portable FT-IR could be utilized to obtain a spectrum of the coating that could be compared to the FT-IR spectrum specified in the preloaded design information. An evaluation of the two spectra via the surface coating metrology system 203, would result in a satisfactory or unsatisfactory result. If the color or FT-IR spectrum is unsatisfactory, the user can be notified on the mobile interface device 201, and corrective action taken, or acceptance of an out-of-specification conditions would be required.

Dry Film Thickness (DFT)

Information: The DFT requirements for each coat of paint along with the expected total DFT may be provided at the mobile interface device 201. The number of necessary measurements based on the surface area will be available per the design specification. The requirements pertaining to the locations of the measurements may be preprogrammed into the system. Such requirements could include, e.g., indications that a batch reading is the average of five spot measurements taken in a 100 square feet area or that for areas between 300 to 1000 square feet, three 100 square feet sections shall be randomly selected and measured, etc.

Validation: The DFT measurements will be taken and their locations automatically or manually input into the surface coating metrology system 203 to allow three dimensional mapping. The DFT measurements and the location of the measurements may be identified as satisfactory or unsatisfactory for the user on the mobile interface device 201. If the DFT measurements are unsatisfactory, corrective action can take place, or the out-of-specification measurements can be accepted as-is with approval. In some cases, a map of the discrepancies may be provided to the mobile interface device 201. When multiple coats of paint are required, the surface coating metrology system 203 may calculate the DFT of the individual subsequent coats by subtracting the average DFT of the previous coat from the total DFT measured. The results of the calculations can then be supplied to the user on the mobile interface device 201.

Paint Flaws

Information: Paint items considered flaws during an inspection may be included in the information provided to the user on the mobile interface device 201. Flaws may be identified photographically or by direct observation.

Validation: The location of flaws in the coating will be mapped via the surface coating metrology system 203, manually or automatically. Example flaws may include rust, bleeding rust, pinhole rust, checking, cracking, flaking, scaling, peeling, blistering, bleeding contaminants, puddling, holidays, scrapes, cuts, abrasions, mechanical damage, paint applied over dirt, paint applied over grit, paint applied over debris, pinholing, fish eyes, cratering, pitting, wrinkling, overspray, orange peel, cob webbing, visual presence of amine bloom, visual presence of chlorides, runs, drips, sags, or other contractually invoked identified flaw. Flaw location and type information may be provided to the operator on the mobile interface device 201.

Insulation Operations

When a worker enters a space where an insulation operation (e., installation or removal) is to be performed the worker may be provided with a visual representation of the insulation along with other process information using the mobile interface device 201. The insulation information supplied and subsequent validation information may include the types of information described in the following paragraphs. It will be understood that the information types are not limited to the following and may be provided in any chronological order.

Surface Preparation for Stud Welding or Attachment

Information: Some operations require preparation of surfaces for the welding or attachment of studs. A visual representation of the location where the studs are supposed to be attached may be provided using the mobile interface device 201, as well as the required surface preparation, e.g. SSPC-SP 11. A worker may work from a visual representation of the insulation to install and validate the surface and the surface preparation for stud installation, eliminating the need to take measurements along the bulkhead, overhead, or deck.

Validation: After surface preparation, the area can be scanned or have surface characteristics measured by the surface coating metrology system 203. Alternatively, a picture can be taken and overlaid on a map to verify that the surface preparation for stud attachment is completed and in the correct location. The stud locations will be deemed satisfactory or unsatisfactory to the user through the mobile interface device. If unsatisfactory, the locations of unsatisfactory studs may be provided in an AR map that can be visually overlaid on a camera view of the physical environment.

Stud Material

Information: The shape, size, material type, and quantity of studs required may be provided to the user on the mobile interface device 201. Products that are qualified may also be supplied.

Validation: The material used can be scanned and verified to be correct for the insulation installation via the surface coating metrology system 203.

Attachment of Studs

Information: The manner in which the studs are supposed to be attached to the bulkheads and overheads may be provided to the user on the mobile interface device 201, along with a preprogrammed allowance of error from the exact location. Inspection criteria for the studs may also be provided on the mobile interface device 201.

Validation: Validation information obtained by the surface coating metrology system 203 can include a picture overlaid on or compared to a three dimensional map, or a comparison of a new scan of the target area with the desired configuration. In either case, the location of the studs within a predetermined allowance of error can be verified. The inspection results of the studs may also be documented and stored by the surface coating metrology system 203, and the results of satisfactory or unsatisfactory conveyed to the user on the mobile interface device 201. If the inspection is unsatisfactory, a representation of the discrepancy may be provided to the mobile device so that corrective action can be taken.

Insulation Material

Information: The type and amount of insulation required may be provided (e.g. acoustic, thermal, etc.) on the mobile interface device 201. Additionally, if glue and tape are required, the type and amount can be estimated and provided. Information on the qualified products for insulation, glue, and tape will be transmitted to the mobile interface device 201 for the target area.

Validation: The actual materials can be scanned using the mobile interface device and/or the surface coating metrology system 203 and compared with specified materials or material characteristics to ensure that the material meets the specifications and that it is not expired. The results of the scan will be provided to the user on the mobile interface device 201.

Insulation Installation

Information: The type of insulation installed in a target area may depend on a variety of factors. On a ship, the insulation for a particular area can depend on the compartment and the adjacent compartment that shares the bulkhead. A single compartment could require different kinds of insulation, e.g. one kind on the wall, and a different one on piping, or no insulation at all. The system of the present invention can provide a three dimensional map viewable on the mobile interface device 201. This map provides a visual display of the specific insulation required on different portions of a compartment as well as where the caps to the studs should appear on the insulation types that require studs.

Validation: A visual representation (e.g., a photo captured by the mobile interface device 201) of the target area can be overlaid on the three dimensional map to ensure insulation has been applied where it was supposed to be applied or a new scan of the target area can be made using the surface coating metrology system 203. The results would be satisfactory or unsatisfactory. The user would be notified of the results on the mobile interface device 201, and if the results are unsatisfactory, corrective action could be taken or approval of the out-of-specification insulation would be required.

Paint

In some cases, paint or some other coating is required over insulation. If such is the case, similar criteria and information as set forth in the painting section would be implemented.

Deck or Floor Covering

Deck covering information may be preprogrammed into the mobile interface device 201 or stored in or by the central processor 210, along with the chronological order of events for an installation process. The deck covering information supplied and validation used can include the following, not necessarily in chronological order.

Deck or Floor Material

Information: The shape, size, material type, and quantity of deck material required may be provided for display to the mobile interface device 201. This can include, for example, tile, diamond plate, non-skid tape, or any other flooring material. Information on any additional material (e.g. cement, sealant, etc.) required for installation of the deck/floor covering may be provided as well as an estimate of the amount of material necessary. Information on specific procedures may also be provided.

Validation: The material used may be scanned and verified to be the correct product type, color, and unexpired using the surface coating metrology system 203. The results of the validation would be communicated to the user through the mobile interface device 201.

Paint

In some cases, paint or some other coating is required over deck covering material. If such is the case, similar criteria and information as set forth in the painting section would be implemented.

Troubleshooting

Troubleshooting requiring additional data measurement is sometimes required during a coating process. Additionally, with the advancement of portable analytical tools, additional quality control measures could be required in the future. Therefore, portable instrumental techniques could be used to give wireless measurements, with the location of the measurement mapped using mobile interface device 201. However, if wireless technology is not present, the measurements could be input manually and the location documented.

Currently, there is a host of portable equipment that may be utilized for surface protection troubleshooting operations including Ramon spectroscopy, FT-IR, Near-Infrared Spectroscopy (NIR), 3D topography, x-ray fluorescent (XRF) analyzers, colorimeters, microscopes, gloss meters, gas analyzers, adhesion analyzers, DFT gauges, cameras, surface profile gauges, dew point meters, thermometers, conductivity analyzers, chloride analyzers, and humidity meters.

It should be noted that gas analyzers could be used for identification of gases in a confined space for safety, e.g. to ensure oxygen levels are adequate, or to identify and quantify the presence of gases sometimes found on a ship such as argon, hydrogen sulfide, or acetylene, etc. A visual representation of the gas and any pertinent properties such as extent, intensity, and movement may be provided through mobile interface device 201 as described in U.S. application Ser. No. 14/686,427. Future portable surface or gas analysis equipment could also be linked. Any current or future equipment or instrumentation utilizing the interaction of radio waves, microwaves, infrared wavelengths, visible wavelengths, ultraviolet wavelengths, x-rays, gamma rays, electron beams, lasers, plasmas, direct current, alternating current, magnetism, eddy currents, thermal gradients, solvents, chemical agents, resistance, conductivity or combination therein with the substrate, coating, insulation, deck covering, glue, tape or any material associated with the compartment that aids in qualitatively or quantitatively evaluating material or specific components in a material could be linked to the surface protection operation display systems of the invention.

While this disclosure has focused on paint, insulation, and deck covering applications, the methods of the invention may be extended to any type of surface protection or preservation operations to allow a worker to visualize desired information and, in some cases, the difference between what was expected or required and the as-built condition. The as-built tolerances may be compared to a 3D model, or other representation of the intended design, and the resulting information may be visually provided to a worker through the mobile interface device 201 in real time so that corrections may be made during the fabrication process.

As has been discussed, while the systems and methods of the present invention have a particular value when applied to vessels and other mobile structures, they may also be applied to stationary buildings and other structures as well. In stationary environments, GPS and GIS information are typically available and may be used by the operating system. The invention is, however, of particular utility in shipboard or other mobile/dynamic environments in which GPS information may be unreliable or unavailable. As has also been discussed, the present invention also addresses the problem of dynamic changes in structure and relative positioning such as are often encountered in large vessels. It will be understood that in some embodiments, the invention may be usable in a setting in which the user is not inside a structure and that the term "structural environment" may encompass exterior structural settings.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for providing information to a mobile interface device user for use in conducting an operation on a surface of a target object in a dynamic structural environment in the form of a dynamic structure having an environment coordinate system, the method comprising:
receiving on a central data processor from the mobile interface device over a communication network a request for target object surface information associated with a target object in the dynamic structural environment;
determining a pose of the mobile interface device relative to the target object surface;
obtaining target object surface information for one or more measurable target object characteristics;
assembling augmented reality (AR) target object surface information for transmission to and display on the mobile interface device, the AR target object surface information being assembled using the target object surface information and being configured for viewing in conjunction with a real-time view of the target object captured by the mobile interface device; and
transmitting the AR target object information to the mobile interface device,
wherein the action of determining the pose of the mobile interface device relative to the target object surface accounts for spatial changes in the environment coordinate system resulting from changes in the dynamic structural environment.

2. A method according to claim 1, wherein the AR target object information includes information configured to assist the mobile interface device user in conducting a surface protection operation.

3. A method according to claim 2, wherein the surface protection operation includes at least one of the set consisting of a coating application operation, a coating removal operation, a chemical treatment operation, an insulation application operation, an insulation removal operation, and a surface cleaning operation.

4. A method according to claim 2, wherein at least the actions of obtaining target data, assembling AR target object information and transmitting the AR target information are repeated after at least a portion of the surface protection operation has been accomplished.

5. A method according to claim 1, wherein the mobile interface device is one of the set consisting of a tablet computer, a smartphone, and a wearable heads-up display.

6. A method according to claim 1 wherein the request for target object surface information includes a digital image of the target object captured by the mobile interface device.

7. A method according to claim 1 wherein the request for target object surface information includes information usable by the central data processor to determine the pose of the mobile interface device relative to the target object and the action of determining includes:
   receiving mobile interface device location information from a local positioning system, said location information being provided in a coordinate system associated with the dynamic structure; and
   using the location information and the digital image to determine the pose of the mobile interface device.

8. A method according to claim 1 wherein the action of determining includes:
   receiving pose information from the mobile interface device.

9. A method according to claim 1 wherein the action of obtaining target object surface information includes:
   receiving measured target object surface data from a measurement data system.

10. A method according to claim 9 wherein the measured target object surface data comprises surface topography data.

11. A method according to claim 9 wherein the action of assembling the AR target object surface information comprises:
    comparing measured target object surface data to a desired surface condition for a predetermined surface parameter to determine a target object surface parameter deviation; and
    constructing a graphical AR representation of the target object surface parameter deviation that can be superimposed over a real-time view of the target object captured by the mobile interface device.

12. A method according to claim 11 wherein the predetermined surface parameter is one of the set consisting of surface topography, a geometric boundary of a coated region, a surface coating profile, a coating thickness.

13. A method according to claim 11 wherein the AR target object surface information includes information configured to assist a user of the mobile interface device in correcting at least a portion of the target object surface parameter deviation.

14. A method according to claim 9 wherein the measured target object data comprises coating thickness measurements and associated measurement location data.

15. A method according to claim 9 wherein the AR target object information includes a graphical representation of at least one target object surface parameter, the graphical representation being constructed using the target object surface data.

16. A method according to claim 1 wherein the AR target object information includes at least one of the set consisting of a surface coating area map, textual surface characteristic information, textual covering material information, coating thickness data, flaw location information, surface protection operation instructions, and surface protection operation requirements.

17. A method according to claim 1 further comprising:
    obtaining target object environment information including at least one measurable parameter associated with an environment in which the target object is disposed;
    assembling AR environment information for transmission to and display on the mobile interface device, the AR environment information being assembled using the target object environment information and being configured for viewing in conjunction with a real-time view of the target object captured by the mobile interface device; and
    transmitting the environment information to the mobile interface device.

18. A method according to claim 17 wherein the at least one measurable parameter is one of the set consisting of target object surface temperature, ambient air temperature, atmospheric pressure, wind direction and speed, relative humidity, and dew point.

19. A method according to claim 1 wherein dynamic structure defines an interior space in which the target object is disposed.

20. A method according to claim 1 wherein the dynamic structure comprises the target object.

21. A method according to claim 1 wherein the spatial changes result from flexure of the dynamic structure.

22. An automated system for providing information to a mobile interface device for use in conducting an operation on a surface of a target object in a dynamic structural environment in the form of a dynamic structure having an environment coordinate system, the system comprising:
    at least one mobile interface device configured for variable disposition within the dynamic structural environment, capturing information about the target object within the structural environment, and transmitting the target object information over a network;
    a local positioning system in communication with the at least one mobile interface device via the network and configured to provide information usable to determine a mobile interface device pose relative to the target object in the environment coordinate system; and
    a central processor comprising at least one data processing machine in communication with the at least one mobile interface device and the local positioning system via the network, the central processor being configured for
       receiving from a requesting one of the at least one mobile interface device a request for target object surface information, the request including information usable to determine the mobile interface device pose relative to the target object;
       determining the pose of the requesting mobile interface device relative to the target object;
       obtaining target object surface information for one or more measurable target object characteristics;
       assembling augmented reality (AR) target object surface information for transmission to and display on the mobile interface device, the AR target object surface information being assembled using the target object surface information and being configured for viewing in conjunction with a real-time view of the target object captured by the mobile interface device; and transmitting the AR target object information to the mobile interface device, wherein the action of determining the pose of the mobile interface device relative to the target object accounts for spatial changes in the environment coordinate system resulting from changes in the dynamic structural environment.

23. A system according to claim 22 further comprising:

an environment data system configured for capturing target object surface information.

24. A system according to claim 23 wherein the environment data system comprises a surface metrology system configured for obtaining target object surface data for use in determining at least one of the set consisting of a topography of the target object surface, target object coating thickness at specific locations, and target object coating area dimensions and boundaries.

* * * * *